(12) United States Patent
Lien

(10) Patent No.: US 6,343,524 B1
(45) Date of Patent: Feb. 5, 2002

(54) BICYCLE REAR DERAILLEUR SHIFTING CONTROLLER

(76) Inventor: Kuo-Cheng Lien, 5F-23, 70, Fu-Shing Road, Taoyuan (TW)

( * ) Notice: Subject to any disclaimer, the term of this patent is extended or adjusted under 35 U.S.C. 154(b) by 0 days.

(21) Appl. No.: 09/479,622

(22) Filed: Jan. 7, 2000

(51) Int. Cl.$^7$ .......................... B62K 23/04; B62M 25/04
(52) U.S. Cl. .................................... 74/502.2; 74/473.28
(58) Field of Search .............................. 74/502.2, 489, 74/473.14, 473.28; 116/28.1

(56) References Cited

U.S. PATENT DOCUMENTS

| | | | | |
|---|---|---|---|---|
| 5,241,877 A | * | 9/1993 | Chen | 74/502.2 X |
| 5,476,019 A | * | 12/1995 | Cheever et al. | 74/502.2 X |
| 5,682,963 A | * | 11/1997 | Tang | 74/502.2 X |
| 5,802,927 A | * | 9/1998 | Yu et al. | 74/502.2 |
| 6,021,688 A | * | 2/2000 | Chang | 74/502.2 |

* cited by examiner

Primary Examiner—Mary Ann Green
(74) Attorney, Agent, or Firm—Troxell Law Office PLLC

(57) ABSTRACT

A bicycle rear derailleur shifting controller includes a base having a shell and a coupling tube extended from the shell, a rotary knob having a body coupled to the coupling tube of the base and a handgrip formed integral with one end of the body, the body having a recessed portion, a raised block, and a locating hole through the raised block, a spring plate fixedly mounted inside the shell of the base, the spring plate having a protruding portion, an arched positioning block mounted in the recessed portion at the body of the rotary knob, the positioning block having a series of notches meshed with the protruding portion of the spring plate to guide rotary motion of the rotary knob on the coupling tube and to hold the rotary knob in position after a rotary motion, a cover plat covered on the recessed chamber to stop the rotary knob from axial movement on the coupling tube of the base, and a derailleur cable moved with the rotary knob to shift the rear derailleur mechanism of the bicycle.

3 Claims, 4 Drawing Sheets

BICYCLE REAR DERAILLEUR SHIFTING CONTROLLER

BACKGROUND OF THE INVENTION

The present invention relates to a bicycle rear derailleur shifting controller, and more particularly to a simple structure of bicycle rear derailleur shifting controller, which is inexpensive to manufacture, and which can easily be controlled to shift the rear derailleur mechanism of the bicycle.

A regular bicycle rear derailleur-shifting controller is generally comprised of a base and a rotary knob. The base comprises a coupling tube coupled to the handlebar of the bicycle. The rotary knob is fastened to an endpiece at one end of the derailleur cable, and rotatably coupled to the coupling tube of the base. Further, an arcuate spring member and a detent section are respectively provided at the base and the rotary knob. The arcuate spring member comprises an indexing projection shifted between notches at the detent section. The derailleur cable is driven to shift the rear derailleur mechanism of the bicycle upon rotary motion of the rotary knob. This structure of bicycle rear derailleur shifting controller is not satisfactory in function. Because the derailleur cable is wound round the coupling tube of the base and turned radially with the rotary knob around the coupling tube, it tends to be hindered by internal structure of the base, causing the rear derailleur mechanism shifting operated unable to be accurately achieved.

SUMMARY OF THE INVENTION

The present invention has been accomplished to provide a bicycle rear derailleur-shifting controller, which eliminates the aforesaid problem. According to one aspect of the present invention, the bicycle rear derailleur shifting controller comprises a base having a shell and a coupling tube extended from the shell, a rotary knob having a body coupled to the coupling tube of the base and a handgrip formed integral with one end of the body, the body having a recessed portion, a raised block, and a locating hole through the raised block, a spring plate fixedly mounted inside the shell of the base, the spring plate having a protruding portion, an arched positioning block mounted in the recessed portion at the body of the rotary knob, the positioning block having a series of notches meshed with the protruding portion of the spring plate to guide rotary motion of the rotary knob on the coupling tube and to hold the rotary knob in position after a rotary motion, a cover plate covered on the recessed chamber to stop the rotary knob from axial movement on the coupling tube of the base, and a derailleur cable moved with the rotary knob to shift the rear derailleur mechanism of the bicycle. According to another aspect of the present invention, the cover plate comprises a plurality of projections raised from a smoothly curved side edge thereof and inserted into the recessed portion at the body of the rotary knob to stop the rotary knob from axial movement along the coupling tube.

DETAILED DESCRIPTION OF THE PREFERRED EMBODIMENT

Figure 1:
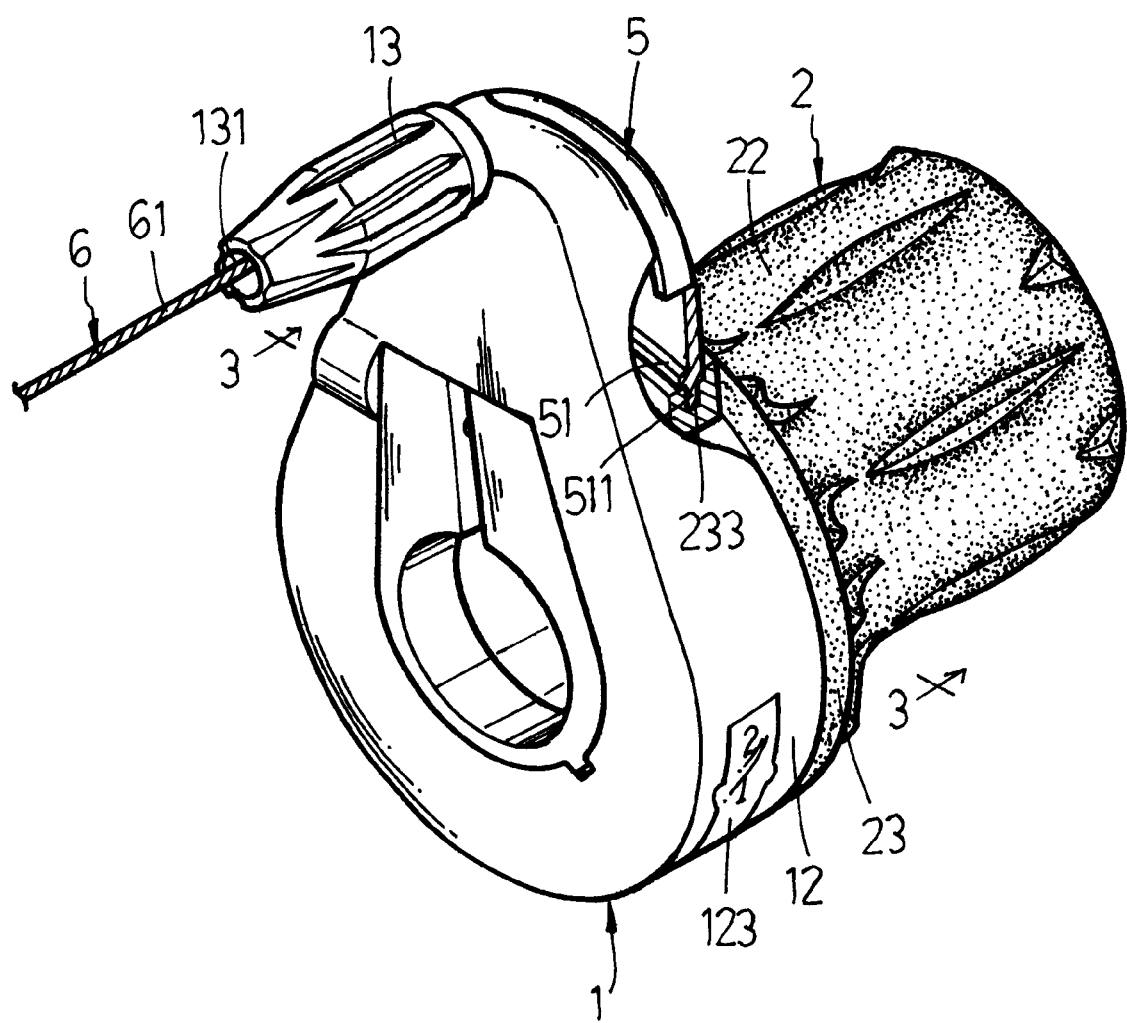
FIG. 1 is a perspective view of a bicycle rear derailleur-shifting controller according to the present invention.

Referring to FIGS. from 1 through 3, a bicycle rear derailleur-shifting controller in accordance with the present invention is shown comprised of a base 1, a rotary knob 2, a locating spring plate 3, a positioning block 4, a cover plate 5, and a derailleur cable 6.

The base 1 comprises a shell 12, a coupling tube 11, and a guide tube 13. The coupling tube 11 and the guide tube 13 are respectively formed integral with the shell 12 at two opposite sides at different elevations. The coupling tube 11 is provided for fastening to the bicycle's handlebar. The shell 12 comprises a pair of locating flanges 121 disposed on the inside, a recessed chamber 122, a cable groove 1221 extended in the recessed chamber 122 between the guide tube 13 and the coupling tube 11, and a screw hole 1222 in the recessed chamber 122. The guide tube 13 defines an axial through hole 131 disposed in communication with the cable groove 1221 in the recessed chamber 122. The locating spring plate 3 is mounted inside the shell 12 and secured to the locating flanges 121, comprising a protruding portion 31 aimed at the coupling tube 11.

The rotary knob 2 is coupled to the coupling tube 11 of the base 1, comprising a body 23 and a handgrip 22 formed integral with one end of the body 23 for operation by hand. The body 23 comprises an axial center hole 21, which receives the coupling tube 11, an arched, recessed portion 231, a raised block 232, and a groove 233 around the recessed portion 231. The raised block 232 comprises a recessed hole 2321, and a locating hole 2322 (see FIG. 3).

Figure 3:
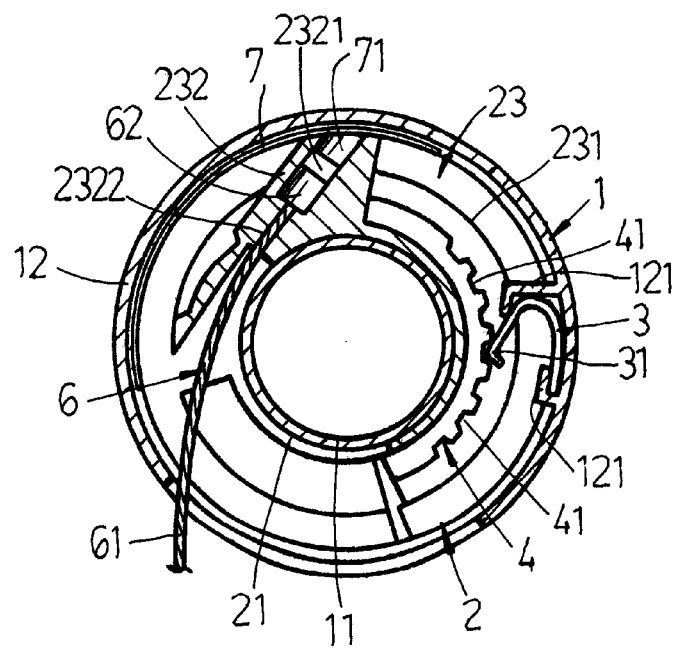
FIG. 3 is a sectional taken along line 3—3 of FIG. 1.
Figure 4:
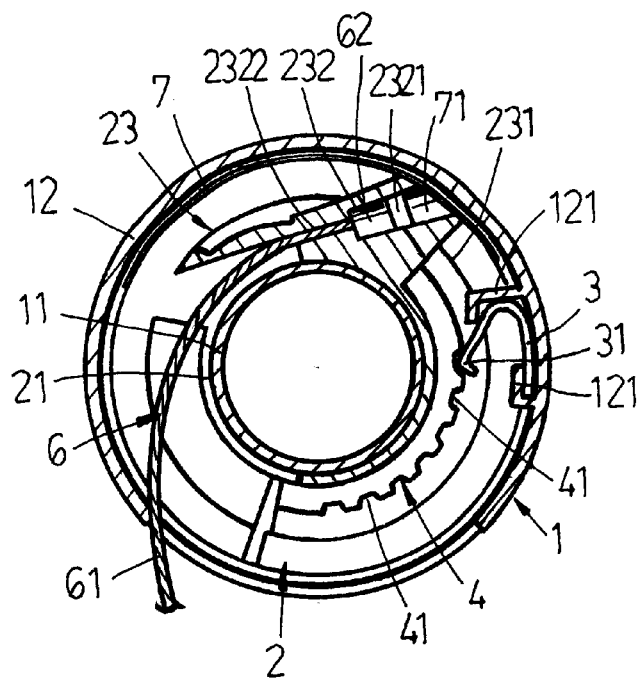
FIG. 4 is similar to FIG. 3 but showing the rotary knob rotated, the derailleur cable moved.

The positioning block 4 is an arched block fitting the recessed portion 231 in the body 23 of the rotary knob 2, comprising a series of notches 41. As illustrated in FIG. 3, after connection of the base 1 with the rotary knob 2, the protruding portion 31 of the spring plate 3 is engaged with the notches 41 at the positioning block 4. When rotating the rotary knob 2 on the base 1, the positioning block 4 is moved with the rotary knob 2 to shift the engagement between the notches 41 at the positioning block 4 and the protruding portion 31 of the spring plate 3 (see FIG. 4). Therefore, the rotary knob 2 can be rotated on the base 1 to the desired angle, and then retained in the adjusted position.

Figure 5:
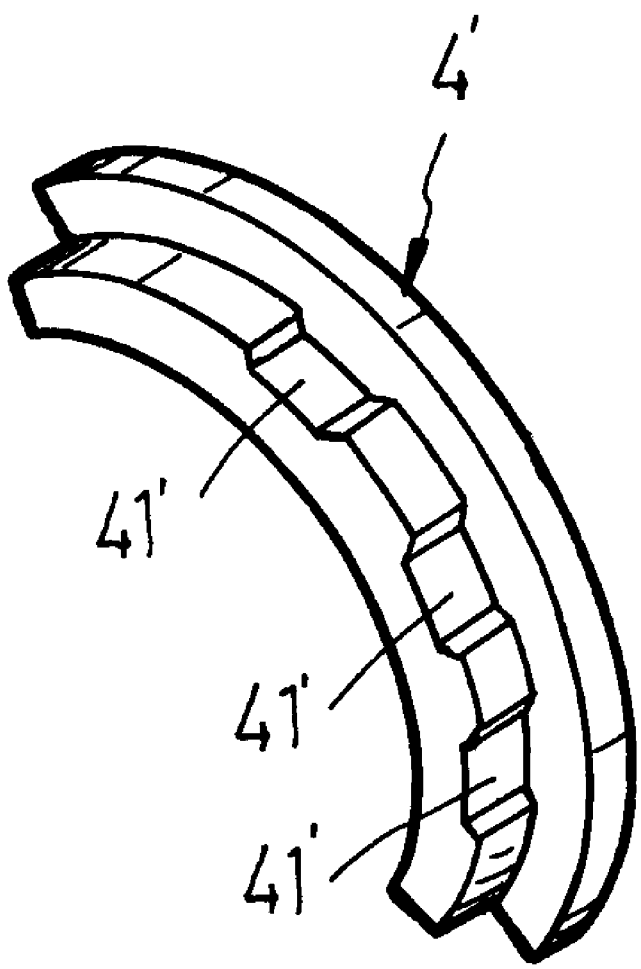
FIG. 5 shows an alternate form of the positioning block for the bicycle rear derailleur-shifting controller according to the present invention.

FIG. 5 shows an alternate form of the positioning block. According to this alternate form, the spacer block 4' has a different number of notches 41'.

Referring to FIGS. from 2 through 4 again, an index plate 7 is fastened to the body 23, having a bottom plug rod 71 plugged into the recessed hole 2321 on the raised block 232. The index plate 7 has codes on the face thereof for indicating different gear positions.

Figure 2:
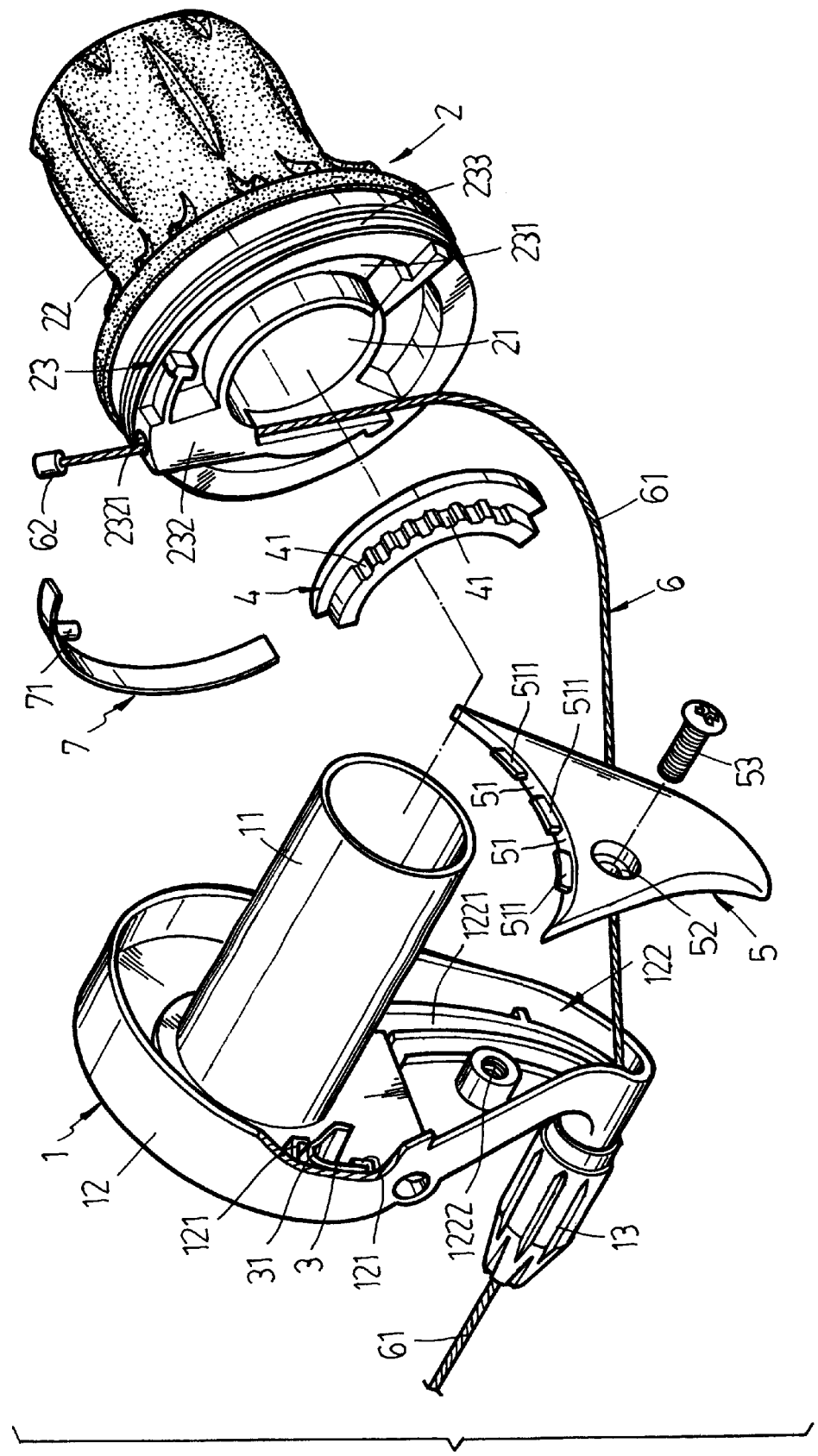
FIG. 2 is an exploded view of the bicycle rear derailleur-shifting controller shown in FIG. 1.

Referring to FIGS. 1 and 2, the cover plate 5 is covered on the recessed chamber 122 in the shell 12 of the base 1, comprising a countersunk hole 52 fastened to the screw hole 1222 in the shell 12 by a screw 53, and a plurality of projections 511 raised from a smoothly curved side edge 51 thereof and inserted into the recessed portion 231 at the body 23 of the rotary knob 2 to stop the rotary knob 2 from axial movement along the coupling tube 11.

Referring to FIGS. From 1 through 4 again, the line 61 of the derailleur cable 6 has one end inserted through the locating hole 2322 on the body 23 of the rotary knob 2 and fastened with an endpiece 62 outside the rotary knob 2, and an opposite end extended over the outside wall of the coupling tube 11 and the cable groove 1221 in the recessed chamber 122 and then extended out of the guide tube 13 through the axial through hole 131 for connection to the rear derailleur. Further, a view window 123 is provided at the shell 12 of the base 1 through which the rider can see the indication of the index plate 7 (see FIG. 1).

Referring to FIGS. 3 and 4 again, when rotating the rotary knob 2 clockwise, the line 6 of the derailleur cable 6 is taken up in the rear derailleur-shifting controller. On the contrary, when rotating the rotary knob 2 counter-clockwise, the line 6 of the derailleur cable 6 is extended out of the rear derailleur-shifting controller.

What the invention claimed is:

1. A shifting controller for a rear derailleur of a bicycle, the rear derailleur having a derailleur cable, the shifting controller comprising:
   a) a base having a shell, a coupling tube and a guide tube, the coupling tube and the guide tube extending outwardly in opposite directions from the base, the shell bounding a recessed chamber between the coupling tube and the guide tube, a pair of spaced apart walls extending into the recessed chamber and forming a cable groove therebetween;
   b) a locating spring plate mounted on the shell, the locating spring plate having a protruding portion;
   c) a rotary knob assembly rotatably mounted on the coupling tube and comprising a body with a handgrip, a raised block with a recessed hole and a locating hole communicating with the recessed hole, and an arcuate recess;
   d) an arcuate positioning block located in the arcuate recess, the arcuate positioning block having an outer surface with a plurality of notches therein, the arcuate positioning block located such that the protruding portion of the locating spring plate engages one of the plurality of notches; and,
   e) an arcuate index plate with indicia thereon for indicating different gear positions, the arcuate index plate having a concave surface, a plug rod extending from the concave surface and engaging the recessed hole so as to attach the index plate to the rotary knob assembly, whereby the derailleur cable passes through the guide tube, the cable groove, the locating hole and is retained in the recessed hole.

2. The shifting controller of claim 1 further comprising a cover plate removably attached to the base so as to cover the recessed chamber.

3. The shifting controller of claim 1 further comprising a pair of spaced apart locating flanges, each having an L-shaped configuration, extending from the shell wherein the locating spring plate is mounted between the locating flanges.

* * * * *